United States Patent

Katayama

[11] Patent Number: 5,927,630
[45] Date of Patent: Jul. 27, 1999

[54] FISHING REEL

[75] Inventor: Masatoshi Katayama, Tokyo, Japan

[73] Assignee: Daiwa Seiko, Inc., Tokyo, Japan

[21] Appl. No.: 09/106,131

[22] Filed: Jun. 29, 1998

[30] Foreign Application Priority Data

Jun. 30, 1997 [JP] Japan ................................. 9-174466

[51] Int. Cl.$^6$ ................................................. A01K 89/02
[52] U.S. Cl. .......................... 242/248; 242/247; 242/298
[58] Field of Search ................................. 242/247, 248, 242/298, 299

[56] References Cited

U.S. PATENT DOCUMENTS

| | | | |
|---|---|---|---|
| 3,499,609 | 3/1970 | Policansky | 242/269 |
| 5,374,001 | 12/1994 | Yamaguchi et al. | 242/247 |
| 5,379,959 | 1/1995 | Sato | 242/299 |
| 5,503,343 | 4/1996 | Hirano et al. | 242/247 |
| 5,570,851 | 11/1996 | Yamaguchi et al. | 242/247 |
| 5,605,299 | 2/1997 | Henriksson | 242/247 |
| 5,662,286 | 9/1997 | Hirano | 242/247 |
| 5,678,781 | 10/1997 | Hirano et al. | 242/247 |
| 5,779,171 | 7/1998 | Milano, Jr. et al. | 242/299 |

FOREIGN PATENT DOCUMENTS

| | | |
|---|---|---|
| 6-5467 | 1/1994 | Japan . |
| 7-18568 | 3/1995 | Japan . |
| 7-13161 | 4/1995 | Japan . |

*Primary Examiner*—Donald P. Walsh
*Assistant Examiner*—Minh-Chau Pham
*Attorney, Agent, or Firm*—Liniak, Berenato, Longacre & White

[57] ABSTRACT

A fishing reel includes: a reel main body; a rotary drive shaft being rotatable in association with a handle; and a one-way clutch of a rolling type for allowing the rotary drive shaft to rotate in one direction and prohibitng the rotary drive shaft from rotating in the other direction to thereby prevent the reversed rotation of the rotatary drive shaft. The one-way clutch is disposed between the rotary drive shaft and the reel main body and includes: a rolling member; and an outer race disposed between the rolling member and said main body. The outer race has an engagement portion. Further, the fishing reel includes a rotation preventive member secured to the engagement portion, while being fitted into the reel main body, to thereby prevent the rotation of the outer race with respect to the reel main body.

5 Claims, 9 Drawing Sheets

FISHING REEL

BACKGROUND OF THE INVENTION

1. Field of the Invention

The present invention relates to a fishing reel which incorporates therein a one-way clutch to thereby be able to have a reversal preventive function to prevent the reversal of a rotary drive shaft and, in particular, to a fishing reel which is improved in a one-way clutch mounting structure for mounting a one-way clutch onto the main body thereof.

2. Description of the Related Art

Conventionally, in a fishing reel, there is incorporated a reversal preventive device which is used to prevent the reversed rotation of a drive shaft rotatable in linking with the operation of a handle. As the reversal preventive device, in Japanese Utility Model Unexamined Publications Nos. Hei. 7-13161, Hei. 7-18568, Hei. 6-5467 and the like, there is disclosed a structure which employs a one-way clutch of a rolling type in order to reduce the degree of play for reversal of a drive shaft during a fishing operation to thereby improve the reliability of a hooking operation.

Referring to the structure for mounting the one-way clutch onto the reel main body in the fishing reels respectively disclosed in Japanese Utility Model Unexamined Publications Nos. Hei. 7-13161 and Hei. 7-18568, the outer periphery of an outer race forming a part of the one-way clutch is formed such that the cross section thereof has a non-circular shape, the inner periphery of a support portion forming a part of the reel main body, into which the one-way clutch outer race is to be fitted, is also formed such that the cross section thereof has the same shape as the outer race outer periphery, that is, a non-circular shape, and, by fitting the outer race into the support portion inner periphery, the one-way clutch can be fitted into the support portion of the reel main body in such a manner that the one-way clutch is prevented against rotation. However, in this mounting structure of a rotation preventive fitting type, in order to be able to achieve strong mounting with no play between the outer periphery of the one-way clutch outer race and the inner periphery of the reel main body support portion respectively formed in non-circular shapes while securing their concentricity with respect to the drive shaft, the non-circular-shaped portions of the outer periphery of the outer race of the one-way clutch and the inner periphery of the support portion of the reel main body must be worked with high precision respectively. In fact, however, such high-precision working is not only difficult to realize but also is the cause of the expensive products. Also, the fitted portions of the one-way clutch and reel main body are actually easy to loosen, which makes it difficult to obtain a reversal preventive function capable of reducing the degree of play for reversal due to the wedge action of the one-way clutch of a rolling type.

In more particular, if the outer race of the one-way clutch is fitted into the support portion of the reel main body with strong pressure, then the mutually fitting outer and inner peripheral surfaces of the on-way clutch outer race and reel main body support portion are deformed in an abnormal manner because they are both non-circular in section. Also, if there exists a working error between the mutually fitting portions, then the stronger the fitting pressure is, the more greatly the mutually fitting portions become eccentric following the working error, with the result that the center of the one-way clutch to be assembled to the support portion of the reel main body is caused to shift out of position and thus the concentricity of the one-way clutch with respect to the drive shaft can be impaired easily. This raises some problems: for example, the rotation of the drive shaft is made heavy, the wedge action of the one-way clutch is impaired, and the like. Conventionally, in most cases, the reel main body is formed of resin for the purpose of light weight. In this case, however, since the fitting receive portion of the resin reel main body is soft, the fitting portion thereof can be deformed or worn due to strong loads or shocks given in the reversal preventing operation, that is, the fitting portion can be loosened to thereby cause the reversal preventive device to operate in failure. If the outer race and the like of the one-way clutch are increased in diameter in order to reinforce the rotation preventive fitting portion thereof, then the fishing reel is also unfavorably increased in size as a whole.

On the other hand, in the fishing reel disclosed in Japanese Utility Model Unexamined Publication No. Hei. 6-5467, in order to improve the fitting precision of the one-way clutch with respect to the reel main body, while the outer periphery of the outer race of the one-way clutch is so formed as to have a circular cross section, a securing portion, which is composed of a projecting portion and a recessed portion formed on the end face of the outer race of the one-way clutch, is engaged with a securing portion receive portion formed on the end face of the reel main body, thereby providing an outer race rotation preventive function. In this structure, although an improvement in the concentricity precision of the one-way clutch of a rolling type with respect to the reel main body can be expected, in the reversal preventing operation, strong loads and shocks are directly given to the securing portion composed of the projecting portion and recessed portion formed on the end face of the outer race of the one-way clutch. For this reason, the secured or engaged portions of the one-way clutch and reel main body can be easily deformed, broken or worn, so that they are loosened with respect to each other, that is, play is generated between them soon. As a result of this, it is difficult to obtain a reversal preventive function which is capable of reducing the degree of play for reversal due to the wedge action of the one-way clutch of a rolling type. In this case, especially when the reel main body is formed of resin for the purpose of light weight, because the secured or engagement portion thereof is soft, the deformation or wear of such engaged portion is greater, thereby raising a fear that the reversal preventive device can fail to operate in a considerably early stage. Also, if the parts of the one-way clutch are increased in diameter in order to reinforce the rotation preventive securing portion thereof, then the fishing reel is also unfavorably increased in size as a whole.

SUMMARY OF THE INVENTION

It is an object of the invention to provide a fishing reel in which, without burdening the positioning and mounting portion of the outer race of the one-way clutch onto the support portion of the reel main body, there is provided a separate rotating preventive member which is used to prevent the rotation of the outer race of the one-way clutch, thereby being able to enhance the assembling accuracy, improve the efficiency of the mounting operation and, provide a high-precision reversal preventive function.

In attaining the above object, according to one aspect of the invention, there is provided a fishing reel including: a reel main body; a rotary drive shaft being rotatable in association with a handle; and a one-way clutch of a rolling type for allowing the rotary drive shaft to rotate in one direction and prohibiting the rotary drive shaft from rotating in the other direction to thereby prevent the reversed rotation of the rotary drive shaft. The one-way clutch is disposed between the rotary drive shaft and the reel main body and includes: a rolling member; and an outer race disposed between the rolling member and said reel main body. The outer race has an engagement portion. Further, the fishing reel includes a rotation preventive member secured to the engagement portion, while being fitted into the reel main body, to thereby prevent the rotation of the outer race with respect to the reel main body.

BRIEF DESCRIPTION OF THE DRAWINGS

Similar reference characters denote corresponding features consistently throughout the attached drawings. The preferred embodiments of this invention will be described in detail, with reference to the following figures, wherein.

DETAILED DESCRIPTION OF THE PREFERRED EMBODIMENTS

Now, description will be given below of the preferred embodiments of a fishing reel according to the invention with reference to the accompanying drawings. Here, FIGS. 1 to 6 respectively show a spinning reel for fishing according to a first embodiment of the invention.

Figure 1:
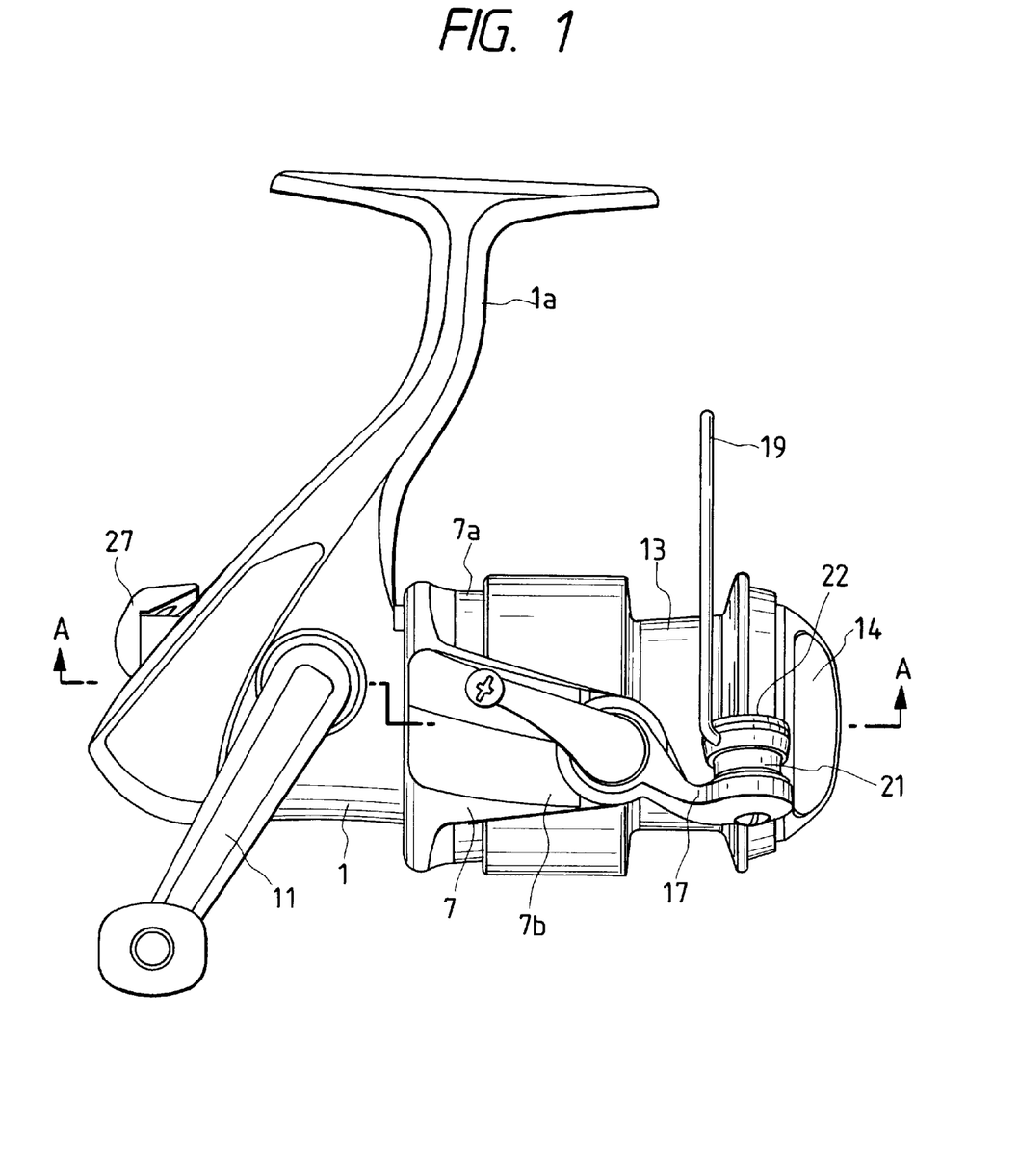
FIG. 1 is a left side view of a spinning reel for fishing according to a first embodiment of the invention.
Figure 2:
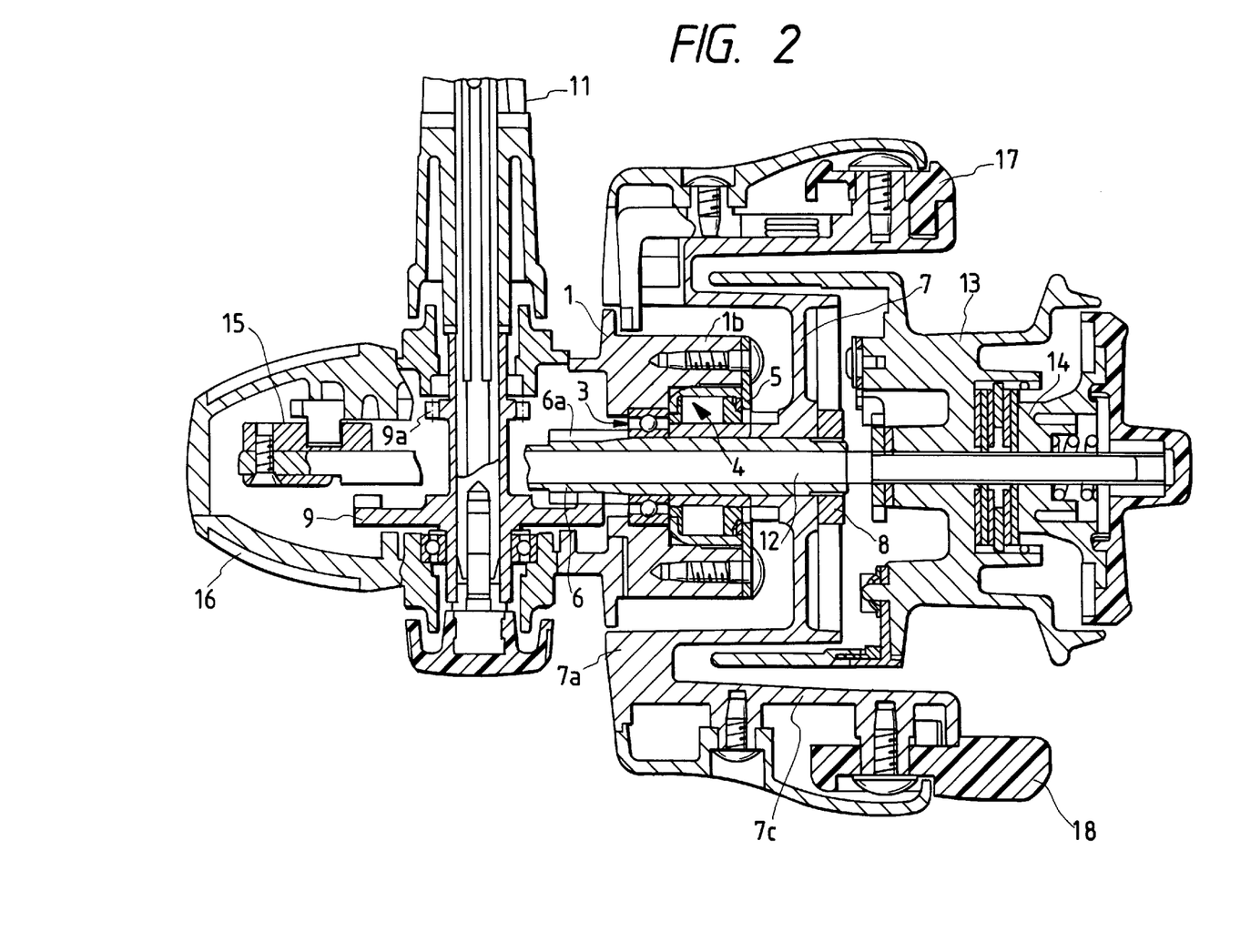
FIG. 2 is a longitudinal section view taken along the line A—A shown in FIG. 1.
Figure 3:
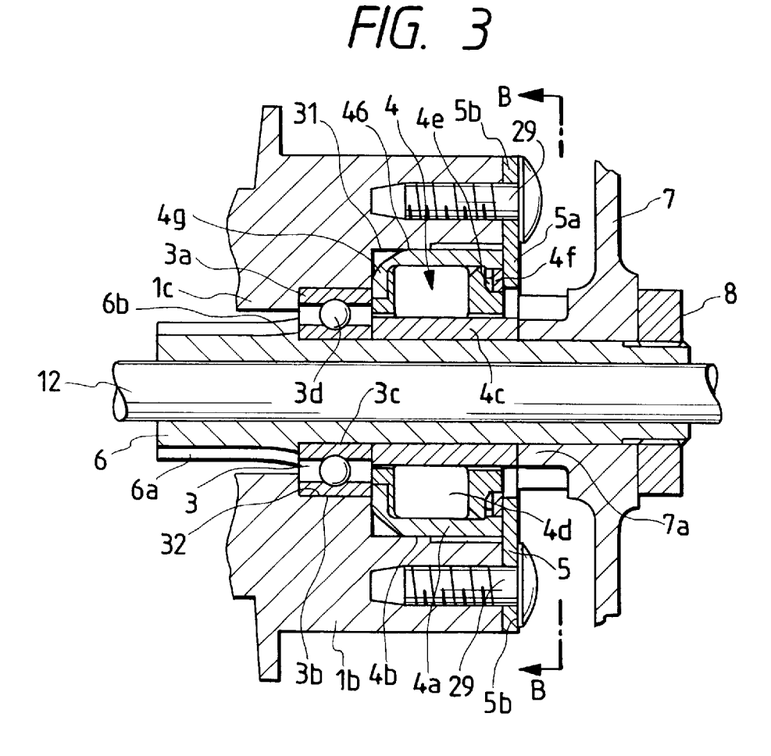
FIG. 3 is an enlarged longitudinal section view of the main portions of the above-mentioned spinning reel for fishing.

As shown in FIGS. 1 and 2, the reel main body 1 of the present spinning reel for fishing includes an upwardly extending rod mounting leg 1a and, in the lower central portion of the reel main body 1, there is formed a cylindrical-shaped support portion 1b which is situated on the front side of the lower central portion of the reel main body 1. Into the interior portion of the support portion 1b, there are fitted a bearing 3 consisting of a rolling bearing and a one-way clutch 4 of a rolling type in such a manner that they are arranged coaxially with each other in the axial direction of the reel main body 1. As shown in FIG. 3, the outer race 3a of the bearing 3 and the outer race 4a of the one-way clutch 4 of a rolling type are fitted with and fixed to the support portion 1b by engaging the respective outer peripheral surface portions 3b and 4b of the bearing 3 and the one-way clutch 4 with the inner peripheral surface of the support portion 1b. Between the outer race 3a and inner race 3c of the bearing 3, there is fitted a rolling ball 3d. By the way, the bearing 3 may also be formed of a metal bearing or a synthetic resin bearing. Also, as will be discussed later, the rear end of the outer race 3a of the bearing 3 is butted against a butting portion 1c formed in the rear end of the support portion 1b, thereby preventing the bearing 3 from being removed backwardly. In addition, the prevention of removal of the bearing 3 and one-way clutch 4 in the forward direction is achieved by a rotation preventive member 5 which will be discussed later.

The support portion 1b supports thereon a drive cylinder shaft (rotation drive shaft) 6 through the bearing 3 and one-way clutch 4 in such a manner that the shaft 6 can be freely rotated. In the front side portions of the drive cylinder shaft 6, which are situated in the vicinity of the base end portion thereof, there are formed a toothed portion 6a and a butting portion 6b in such a manner that they are integral with each other, while the end face of the inner race 3c of the bearing 3 is butted against the butting portion 6b. The inner race 4c of the one-way clutch 4 is fitted through spline fitting or the like with the outer periphery of the front end portion of the drive cylinder shaft 6, in more particular, on the front side of the inner race 3c of the bearing 3 in such a manner that it is movable in the axial direction but is prevented against rotation; that is, the inner race 4c of the one-way clutch 4 is connected to the outer periphery of the front end portion of the drive cylinder shaft 6 in an integral manner. Also, with the outer periphery of the drive cylinder shaft 6, in more particular, on the more front side of the one-way clutch 4, there is fitted a central cylindrical portion 7a of a rotor 7 in a rotation preventive manner, and the central cylindrical portion 7a is mounted on and fixed by a nut 8 which is threadedly engaged with the front-most end portion of the drive cylinder shaft 6. Thus, the inner race 4c of the one-way clutch 4, the boss portion of the center cylindrical portion 7a of the rotor 7, and the inner race 3c of the bearing 3 are respectively held and supported between the butting portion 6b of the drive cylinder shaft 6 and the nut 8.

A drive gear 9 is in meshing engagement with the toothed portion 6a of the drive cylinder shaft 6. The drive gear 9 can be operated or rotated by a handle 11 which is journaled on the reel main body 1. A spool shaft 12, the operation of which is independent of the drive cylinder shaft 6, is inserted into the center hole of the drive cylinder shaft 6 in such a manner that it can be reciprocated in the back-and-forth direction, while a spool 13 for winding is mounted on the leading end portion of the spool shaft 12. The winding spool 13 is connected to the spool shaft 12 through a drag mechanism 14. The winding spool 13 is structured such that, normally, it is frictionally connected to the spool shaft 12 due to the friction force of the drag mechanism 14 and is thereby prevented against rotation, but, if a winding-load of a given level or more is applied to the spool 13, then the spool 13 idles.

To the rear end portion of the spool shaft 12, there is connected a reciprocating device portion 15 which is used to move the spool shaft 12 back and forth. The reciprocating device portion 15, in linking with the rotation of a pinion 9a disposed continuously with the above-mentioned drive gear, 9 in a fishing line take-up operation, reciprocates the spool shaft 12 back and forth together with the spool 13 to thereby carry out a so called oscillating operation in the fishing line take-up operation. By the way, the rear portion of the reel main body 1 is covered with a cap 16.

The above-mentioned rotor 7 includes a pair of bail support arms 7b and 7c; in particular, in the leading end portion of one bail support arm 7b, there is disposed a bail support member 17, while, in the other bail support arm 7c, there is disposed another bail support member 18. A bail 19 is mounted on both of the bail support members 17 and 18. In addition, the two bail support members 17 and 18 can be rotated integrally with the bail 19 and are journaled in such a manner that they can switch the bail 19 reversibly between a fishing line take-up position and a fishing line play-out position. A roller mounting portion 22 for rotatably retaining a fishline guide roller 21 is supported in the bail support member 17.

Figure 5A:
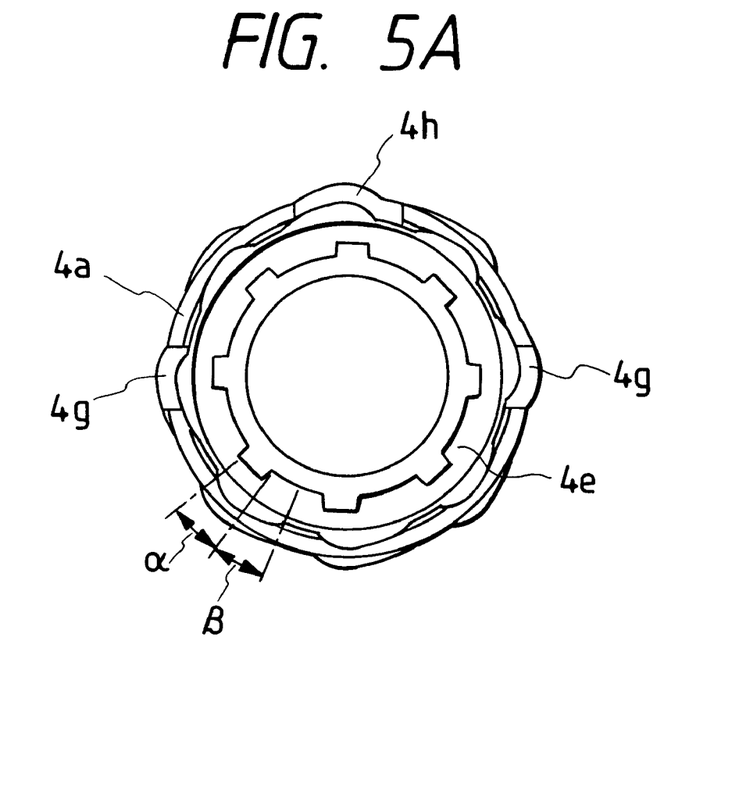
FIG. 5A is an enlarged front view of the rolling-type one-way clutch portion of the above-mentioned spinning reel for fishing.

Next, description will be given below in detail of the structure of the one-way clutch 4 of a rolling type. The one-way clutch 4 is composed of an outer race 4a, the inner race 4c, a plurality of rod-shaped rolling members 4d carried on the outer periphery of the inner race 4c, an annular hold member (retainer) 4e for holding the rolling members 4d, and a spring (not shown). The annular hold member 4e includes a plurality of through holes (net shown), while the rolling members 4d are respectively inserted into and held in the through holes. The spring is used to press and energize the rolling members 4d in their engaging direction. Further, as shown in FIG. 5A, in the inner peripheral surface of the outer race 4a, there are formed a free rotation surface α for the rod-shaped rolling members 4d, and a stop surface β against which the rod-shaped rolling members 4d are butted to thereby prevent the rotation thereof. In addition, the stop surface β is greater in curvature than the free rotation surface α, and is continuous with the free rotation surface α. The annular hold member 4e is applied to switch the states of the rod-shaped rolling members 4d; that is, it positions the rod-shaped rolling members 4d in the free rotation surface α. to thereby allow them to rotate freely in the forward and reversed directions, or it positions the rod-shaped rolling members 4d in the area of the stop surface β to thereby prevent them from rotating in the reversed direction. A switching lever 4f is non-rotatably attached to the annular hold member 4e by engaging projections of the annular hold member with recesses of the switching lever 4f.

The lever 4f extends through a through hole 4h, which is formed in the outer race 4a by cutting away a portion thereof, and projects outwardly of the outer race 4a; in particular, the lever 4f projects further up to the upper outside portion of the support portion 1b. The lever 4f includes an engaging portion 4i which consists of an elongated hole formed in a projecting end portion thereof. And, an operation part 26, which consists of a pin fixed to a disk-shaped rotatable switching member 25, is fitted into and engaged with the engaging portion 4i of the lever 4f. The switching member 25 is structured such that it can select one of two switching positions in an alternative way, for example, by connecting a toggle spring which can produce a dead point. Further, the operation to select the position of the switching member 25 is carried out by rotating the switching member 25 through an operation rod 28 which can be rotationally operated by an operation knob 27 mounted on the back surface portion of the reel main body 1; that is, through this operation, the operation state of the one-way clutch 4 can be switched to a reversal preventive position or to a forward/reverse rotation allowable position.

Next, description will be given below in detail of a structure for mounting the one-way clutch 4 of a rolling type onto the support portion 1b of the reel main body 1.

The reel main body 1, in particular, the cylindrical-shaped support portion 1b thereof includes a first fitting hole 31 which is situated at the front end of the support portion 1b and into which the one-way clutch 4 of a rolling type can be fitted, and a second fitting hole 32 which is situated in the depths of the first fitting hole 31 and into which the bearing 3 can be fitted. The first and second fitting holes 31 and 32 are formed coaxially with each other and are arranged side by side in the axial direction of the reel main body 11 whereas the diameter of the first fitting hole 31 is set larger than the diameter of the second fitting hole 32.

The outer race 4a of the one-way clutch 4 to be fitted into the first fitting hole 31 is made of metal and is formed in a cylindrical shape with a flange portion which is formed in the rear end (deep end) thereof and is projected inwardly, while the front end (outer end) thereof is opened in a circular shape. The outer race 4a of the one-way clutch 4 is fitted into the first fitting hole 31, with the flange portion thereof butted against and connected to the outer race 3a of the bearing 3.

The outer periphery of the outer race 4a of the one-way clutch 4 is formed in a non-circular shape. For example, as shown in FIG. 5A, the outer peripheral surface of the outer race 4a is formed with a plurality of bulged portions with round tips. Each of the bulged portions, and non-bulged portions which respectively connect between the bulged portions is set uniformly in shape and dimension. The height of the bulged portion extending from the non-bulged portion in circumferential direction of the outer race 4a is also set uniformly. Thus, although the outer periphery of the outer race 4a is non-circular as a whole, it is arranged in a point symmetry with the axis of the outer race 4a as the center thereof.

Figure 4:
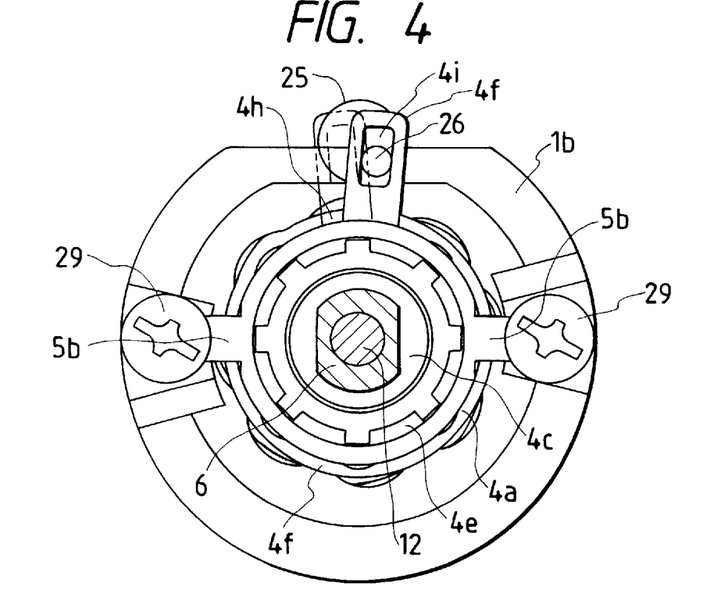
FIG. 4 is a front view of a mounting portion of a one-way clutch of a rolling type, taken along the line B—B shown in FIG. 3.
Figure 6:
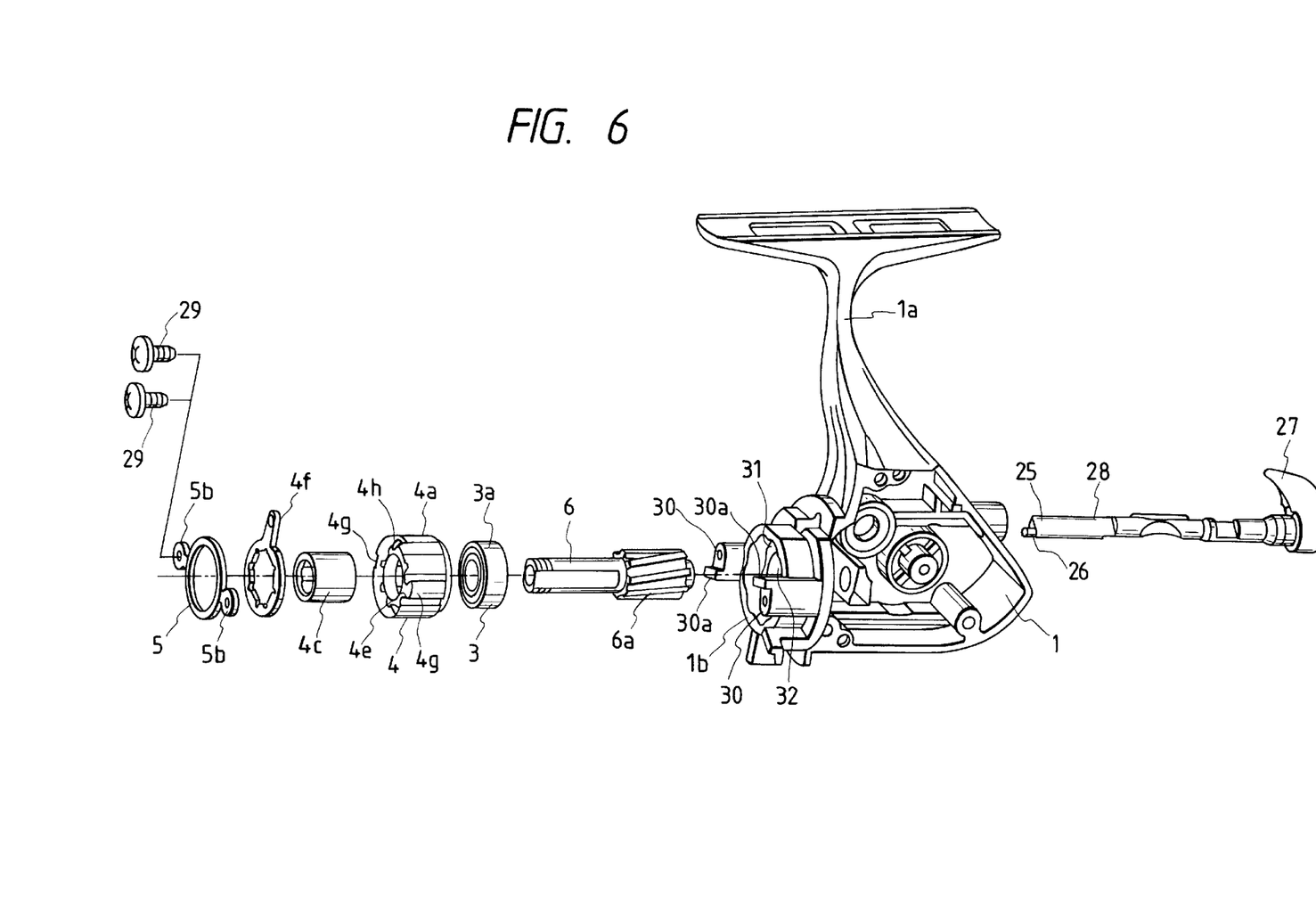
FIG. 6 is an exploded perspective view of the above-mentioned spinning reel for fishing.

On the other hand, the inner periphery of the first fitting hole 31, into which the outer peripheral surface portion of the outer race 4a can be fitted, is also formed in a non-circular shape. In more particular, the inner peripheral surface of the first fitting hole 31 is formed with hollow portions with round tips, and non-hollow portions provided between the hollow portions so as to correspond to the outer peripheral surface portion of the outer race 4a. Each of the hollow portions and non-hollow portions is set uniformly in shape and dimension. The height of the hollow portion extending from the non-hollow portion in circumferential direction is also set uniformly. However, the height of the hollow portion is double that of the bulged portion of the outer race 4a of the one-way clutch 4 from the manufacturing view points. In addition, while the bulged portions of the outer race 4a of the one-way clutch 4 are respectively matched to the hollow portions of the inner peripheral surface of the first fitting hole 31, that is, while the one-way clutch 4 and first fitting hole 31 are meshingly engaged with each other in a relatively close contact manner, they are fitted with each other in such a manner as shown in FIG. 4 that they are prevented against rotation. In FIG. 6, the annular hold member 4e is received within the outer race 4a of the one-way clutch 4.

Figure 5B:
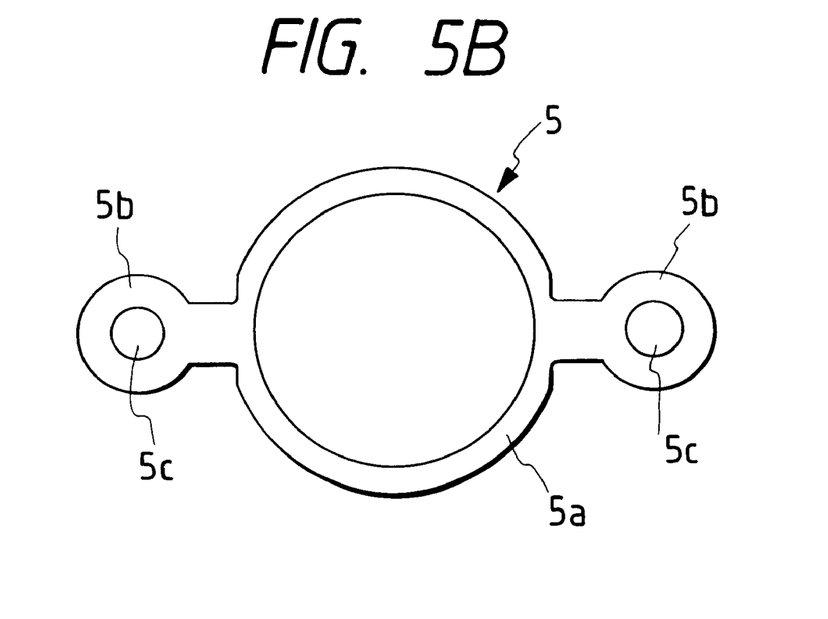
FIG. 5B is a front view of a rotation preventive member.

Moreover, into an opening formed in the front end portion of the outer race 4a of the one-way clutch 4, there is fitted the ring portion 5a of a rotation preventive member 5. The rotation preventive member 5 is structured such that, as shown in FIG. 5B, a plurality of mounting pieces 5b each having a length extending up to the front end face of the support portion 1b are projected outwardly from the ring portion 5a thereof. In this embodiment, the rotation preventive member 5 includes two mounting pieces 5b which are arranged symmetrically. Each of the mounting pieces 5b includes a mounting hole 5c in the leading end portion thereof. The rotation preventive member 5 is formed into a plate shape, for example, by punching a metal member.

Along the edges of the opening of the outer race 4a of the one-way clutch 4, there are formed a plurality of securing grooves 4g which respectively correspond to the mounting pieces 5b of the rotation preventive member 5 so that the mounting pieces 5b of the rotation preventive member 5 can be fitted into and engaged with the securing grooves 4g respectively. Each of the securing grooves 4g is so formed as to match the width of the mounting piece 5b, so that the mounting piece 5b can be closely fitted into and engaged with the securing groove 4g. In this embodiment, the securing grooves 4g form an engaging portion for securing the mounting pieces 5b of the rotation preventive member 5.

The ring portion 5a of the rotation preventive member 5 is fitted into the opening formed in the front end of the outer race 4a of the one-way clutch 4 from the front side in the axial direction of the outer periphery edge portion of the outer race 4a of the one-way clutch 4 and, at the same time, the mounting pieces 5b are fitted into the securing grooves 4b to thereby connect the leading end portions of the mounting pieces 5b to the front end face of the support portion 1b. Moreover, two fixing screws 29 are respectively inserted through the two mounting holes 5c and are then screwed into the corresponding portions of the support portion 1b, and the mounting pieces 5b are respectively held by the head portions of the fixing screws 29 to thereby attach and fix the rotation preventive member 5 to the support portion 1b, whereby not only the removal prevention of the one-way clutch 4 but also the rotation prevention of the outer race 4a can be attained positively. In the front end portion of the support portion 1b, as shown in FIG. 6, there are formed two receive portions 30 with which the leading end portions of the mounting pieces 5b can be contacted. The receive portions 30 may be composed of engaging grooves into which the leading end portions of the mounting pieces 5b can be fitted tight. However, in the illustrated embodiment, each of the receive portion 30 includes a rotation preventive projection 30a which is situated on the advancing side of a rotation force applied to the rotation preventive member 5 from the outer race 4a of the one-way clutch 4 in the reversal preventing operation, so that the rotation preventive projection 30a can receive the leading end portion of the associated mounting piece 5b.

The rotation prevention of the outer race 4a of the one-way clutch 4 can be positively attained by the rotation preventive member 5 that is attached and fixed to the support portion 1b. Further, use of the present mounting structure is sure to prevent the outer race 4a of the one-way clutch 4 from being removed from the first fitting hole 31 and, in more particular, even if the fitting force of the outer race 4a of the one-way clutch 4 fitted into the first fitting hole 31 of the support portion 1b is small, the outer race 4a of the one-way clutch 4 is surely prevented against such removal.

Next, the general operation of the one-way clutch 4 of a rolling type is as follows: That is, if the operation rod 28 and switching member 25 are respectively operated or rotated by the operation knob 27 and the operation portion 26 is thereby rotated to a position shown by a solid line in FIG. 4, then the lever 4f and the annular hold member 4e attached to the lever 4f are rotated clockwise and the rod-shaped rolling member 4d is thereby positioned in the free rotation surface α, that is, the rod-shaped rolling member 4d is held in the non-operation state in which it does not operate as a wedge or a stopper, so that the drive cylinder shaft 6 and rotor 7 can be rotated not only in the forward direction but also in the reversed direction.

Also, if the operation knob 27, operation rod 28 and switching member 25 are respectively operated or rotated and the operation portion 26 is thereby rotated to a position shown by a two-dot chained line in FIG. 4, then the lever 4f and the annular hold member 4e are rotated counterclockwise and the rod-shaped rolling member 4d is thereby positioned in the stop surface β in which it is prevented against rotation, that is, the rod-shaped rolling member 4d is put into its operation state in which it works as a wedge or a stopper. In this state, in the forward rotation of the drive cylinder shaft 6 and rotor 7, since the rod-shaped rolling member 4d is movable clockwise against the spring, the forward rotation of both of the drive cylinder shaft 6 and rotor 7 is possible; on the other hand, in the reversed rotation of the drive cylinder shaft 6 and rotor 7, however, the rod-shaped rolling member 4d is butted against the stop surface β with the wedge action, the reversed rotation of both of the drive cylinder shaft 6 and rotor 7 is impossible.

Referring to the operation of the above-mentioned spinning reel for fishing, if the operation knob 27, operation rod 28, switching member 25, and annular hold member 4e are respectively operated or rotated, then the spinning reel for fishing is put into an operation state shown by the solid line in FIG. 4, that is, into a non-operation state in which the rod-shaped rolling member 4d is situated in the free rotation surface α and does not work as a wedge or a stopper. When the handle 11 is rotated in a direction where a fishing line is wound around the spool 13, then the drive gear 9 is rotated so that the drive cylinder shaft 6 and rotor 7 are rotated forwardly. Further, the reciprocating device portion 15 is operated through the pinion 9a, so that the spool shaft 12 and spool 13 are a reciprocated back and forth.

When the fishing line is wound around the spool 13, the fishing line is guided by a roller 21 provided in a fishing line guide portion formed in one bail support member 17 so that the fishing line can be wound parallel around the spool 13 which is reciprocated back and forth.

When the reversed rotation of the rotor 7 is prevented, the operation knob 27, operation rod 28, switching member 25, and annular hold member 4e are respectively operated or rotated as shown in a two-dot chained line of FIG. 4, the rod-shaped rolling member 4d is situated on the stop surface β, against which the rod-shaped rolling member 4d can be butted and also by which the rotation thereof is stopped, so that the present rod-shaped rolling member 4d is switched over to its operation state in which it works as a wedge or a stopper. If the fishing line is played out due to a tug and the rotor 7 is thereby rotated counterclockwise, that is, if the rotor 7 is rotated in the reversed direction, then the drive cylinder shaft 6 and rotor 7 are rotated in the reverse direction; but, in fact, because the rod-shaped rolling member 4d is situated-on the stop surface β, against which the rod-shaped rolling member 4d can be butted and also by which the rotation thereof is stopped, the reversed rotation of the drive cylinder shaft 6 and rotor 7 is stopped due to the wedge action of the rod-shaped rolling member 4d.

In other words, the annular hold member 4e for holding the rolling member 4d of the one-way clutch 4 of a rolling type is supported in a rotatable manner, and the operation portion 26 of the switching member 25 supported on the reel main body 1 is engaged with the lever 4f provided in the annular hold member 4e, thereby being able to switch the one-way clutch 4 of a rolling type over between the operation state providing the wedge action and the non-operation state free from the wedge action. This can further reduce the degree of play due to the wedge action of the rod-shaped rolling member 4d in the reversed rotation, so that the reversed rotation of the rotor 7 can be stopped very quickly.

Figure 7:
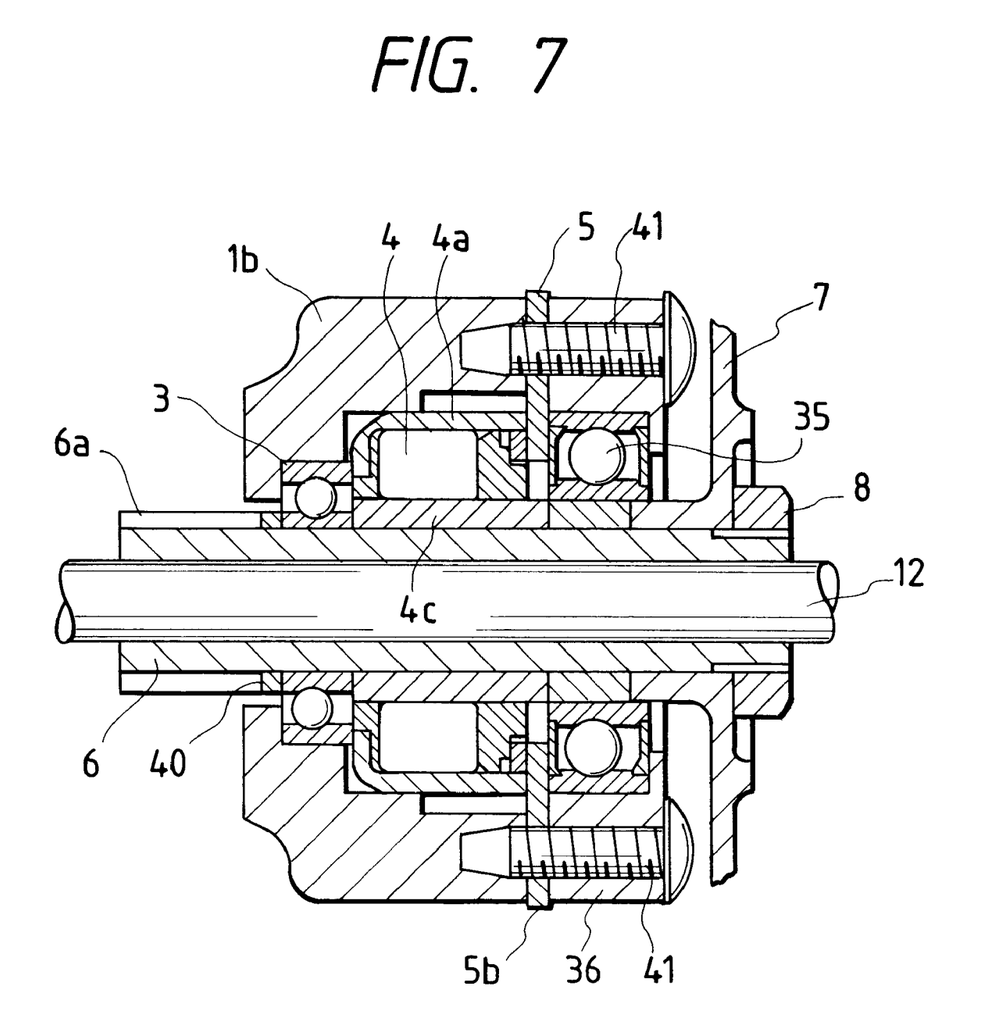
FIG. 7 is an enlarged longitudinal left section view of the main portions of a spinning reel for fishing according to a second embodiment of the invention.
Figure 8:
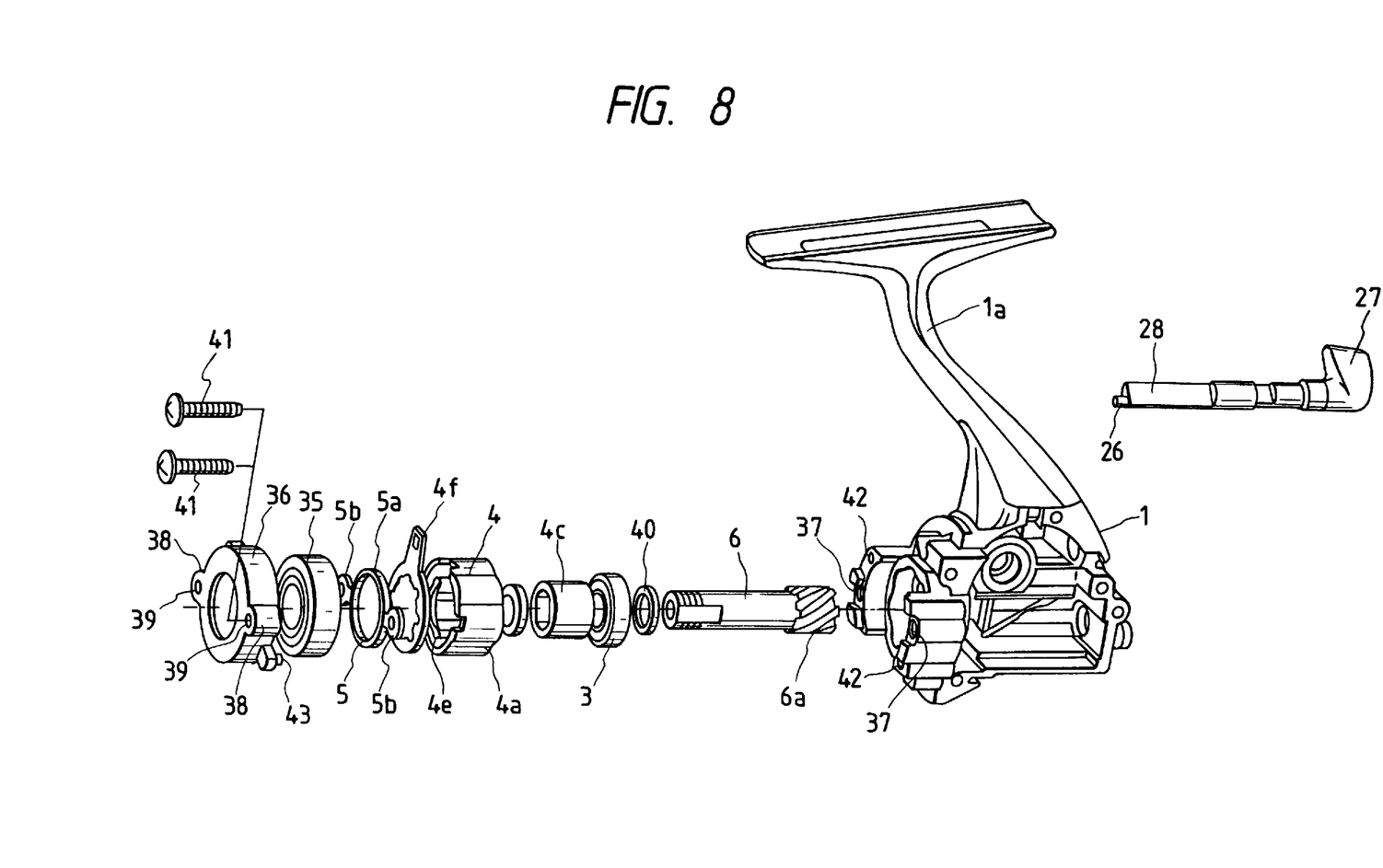
FIG. 8 is an exploded perspective view of the above-mentioned spinning reel for fishing according to the second embodiment of the invention.

Now, FIGS. 7 and 8 show a spinning reel for fishing according to a second embodiment of the invention.

According to the present embodiment, in addition to the above-mentioned bearing 3 and one-way clutch 4, there is further provided a second bearing 35; and, the first and second bearings 3 and 35 are respectively disposed before and behind the one-way clutch 4, and the drive cylinder shaft 6 is supported by the two bearings 3 and 35. Also, the second bearing 35 is fitted into a ring-shaped hold member 36 provided separately from the support portion 1b and is held by and fixed to the hold member 36. The hold member 36 is a cylindrical member which is substantially equal in inside and outside diameters to the support portion 1b, while the hold member 36 includes a plurality of holes 39 which are respectively formed in projecting peripheral portions 38 formed in part of the peripheral portion thereof. And, a plurality of fixing screws 41 are respectively inserted into the holes 39, and the fixing screws 41 are also screwed and fixed to the front end wall of the support portion 1b, so that the hold member 36 can be fixed to the support portion 1b. By the way, in FIGS. 7 and 8, reference character 40 designates a ring which is interposed between the butting portion 6b and toothed portion 6a.

In addition, in the present embodiment, the mounting piece 5b of the rotation preventive member 5, which is to be secured to the front end wall of the support portion 1b, is pressed and fixed by the hold member 36. In the front end wall of the support portion 1b where the mounting piece 5b of the rotation preventive member 5 is to be positioned, there are formed groove-like recessed portions 37 into which the mounting pieces 5b can be inserted tightly. In particular, the mounting pieces 5b are respectively fitted into the recessed portions 37, the projecting peripheral portions 38 of the hold member 36 are then fitted into the recessed portions 37 from the above of the mounting pieces 5b in an overlapping manner and are thereby butted against the mounting pieces 5b, so that the mounting pieces 5b are held between the support portion 1b and hold member 36, that is, the mounting pieces 5b are secured and fixed between the support portion 1b and hold member 36. Similarly to the first embodiment, the fixing screws 41 are inserted through the mounting holes 5c of the mounting pieces 5b. In addition, as described the above, the fixing screws 41 may be inserted through positions which are distant from the positions of the mounting pieces 5b, and the mounting pieces 5b may be positioned within the recessed portions 37; that is, the mounting pieces 5b may be held by and between the front end wall of the support portion 1b and hold member 36, thereby being able to fix the mounting pieces 5b. In this case, another groove-shaped securing recessed portions, into which the mounting pieces 5b can be fitted and positioned, may be formed in the support portion 1b and/or hold member 36. Normally, it is preferred that such securing recessed portions may be formed only in the support portion 1b.

In the hold member 36, there are provided projections 43 which are respectively to be fitted into securing holes 42 formed in the support portion 1b, so that, when the hold member 36 is overlapped on the support portion 1b, the projections 43 can be fitted into and engaged with the securing holes 42.

In the present embodiment, since the mounting pieces 5b of the rotation preventive member 5 are held and fixed between the front end wall of the support portion 1b and hold member 36, the rotation preventive member 5 can be fixed positively. In addition, the present embodiment provides a two-bearing structure in which the first and second bearings 3 and 35 are respectively disposed before and behind the one-way clutch 4 and, in this structure as well, there can be provided a compact rotation preventive member fixing structure without interfering with other assembling members.

As described above, according to the present embodiment, since there is employed the two-bearing structure in which the first and second bearings 3 and 35 are respectively disposed before and behind the one-way clutch 4, it is possible to reduce an irregular pinching force applied onto the drive cylinder shaft 6 through the rotor 7 by the one-way clutch 4 of a rolling type in actual fishing, that is, in the fishing line take-up operation or in the reversing operation. This can stabilize and enhance the support and mounting precision of the drive cylinder shaft 6 as well as improve the durability of the drive cylinder shaft 6, so that a high-precision reversal preventive function due to the wedge action of the one-way clutch 4 of a rolling type can be maintained and fulfilled stably.

Figure 9:
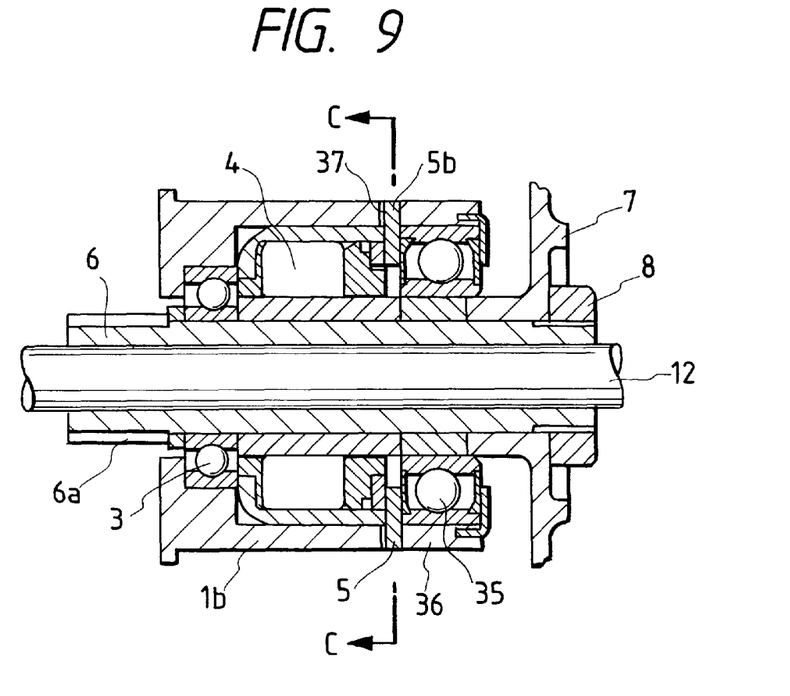
FIG. 9 is an enlarged longitudinal section view of the main portions of a spinning reel for fishing according to a third embodiment of the invention.
Figure 10:
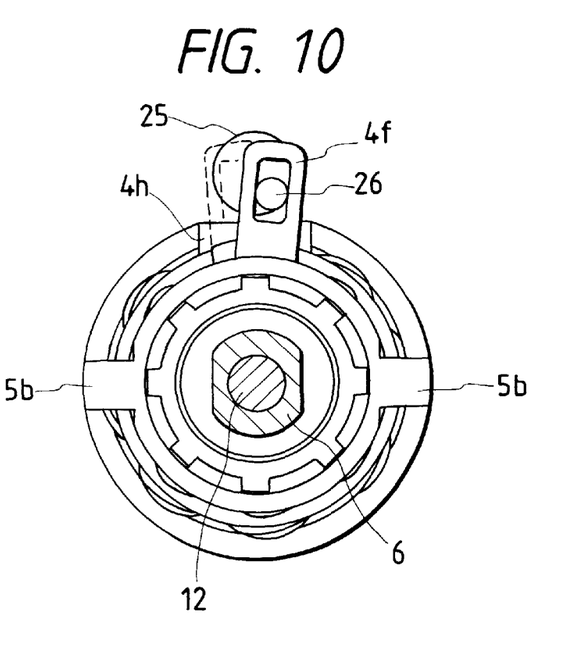
FIG. 10 is a front view of a mounting portion of a one-way clutch of a rolling type, taken along the line C—C shown in FIG. 9.
Figure 11A:
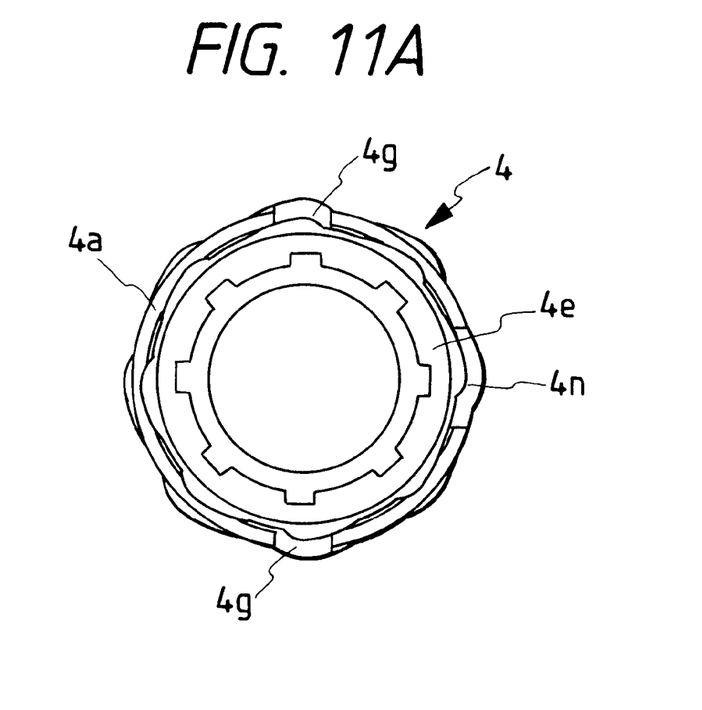
FIG. 11A is an enlarged front view of the rolling-type one-way clutch portion of the above-mentioned spinning reel for fishing.
Figure 11B:
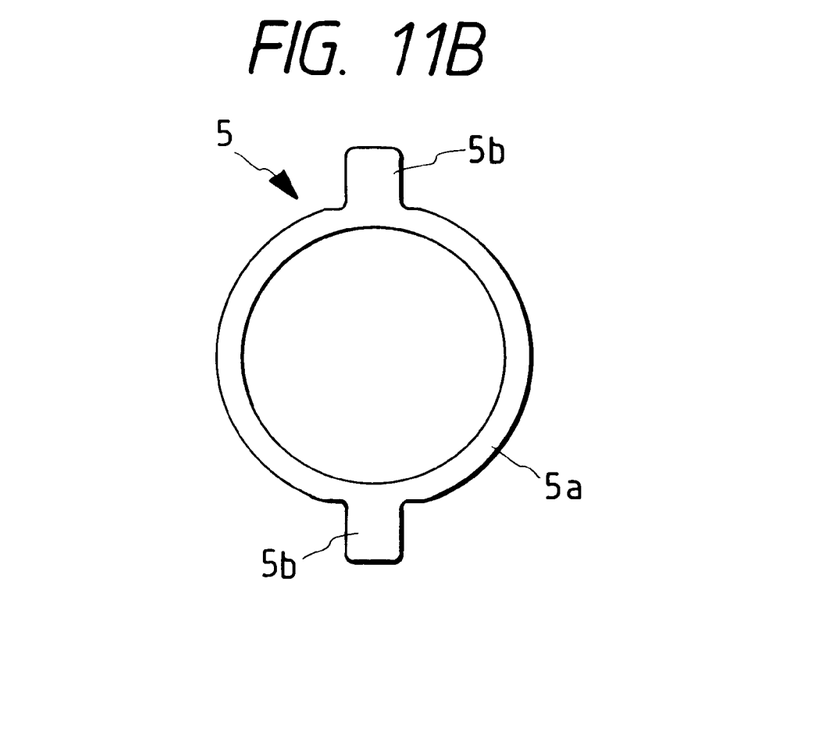
FIG. 11B is a front view of a rotation preventive member according to the third embodiment of the invention.

Now, FIGS. 9 to 11 respectively show a spinning reel for fishing according to a third embodiment of the invention.

In the present embodiment, similarly to the above-mentioned second embodiment, there is employed a structure in which, in addition to the bearing 3 and one-way clutch 4, there is provided the second bearing 35. However, in the present embodiment, the support portion 1b has a small diameter. Therefore, in the mounting pieces 5b of the rotation preventive member 5, there are not formed any holes through which the fixing screws can be inserted but, as shown in FIG. 11, the mounting pieces 5b are respectively formed as short projecting pieces, while the mounting pieces 5b are held and fixed between the end face of the hold member 36 holding the second bearing 35 and the end face of the support portion 1b. In this structure as well, in the end face of the support portion 1b, there are formed groove-like recessed portions 37 into which the mounting pieces 5b can be fitted in a tight manner.

In the present embodiment as well, since the mounting pieces 5b of the rotation preventive member 5 are held and fixed between the front end wall of the support portion 1b and hold member 36, the rotation preventive member 5 can be fixed positively. Because the present embodiment employs a two-bearing structure in which the first and second bearings 3 and 35 are respectively disposed before and behind the one-way clutch 4, there can be provided a compact fixing structure without interfering with other assembling members.

By the way, in the above-mentioned respective embodiments, the inner periphery of the support portion 1b of the reel main body 1 and the outer race 4a of the one-way clutch 4 to be fitted into the support portion 1b are respectively formed non-circular in cross section so that they can be fitted with each other relatively loosely in the rotation direction. However, this is not limitative but, for example, they may be respectively formed circular in cross section and may be fitted together in a rotatable manner, while the rotation prevention of the outer race 4a may be attained only by the rotation preventive member 5. Also, although, in the above-mentioned respective embodiments, the invention is applied to a spinning reel, the invention can also be applied to other types of reels such as a double-bearing reel and the like.

As has been described heretofore, according to the invention, since the rotation prevention of the outer race of the one-way clutch held by the support portion of the reel main body is attained by the rotation preventive member that is provided separately, whereby not only the positioning of the outer race of the one-way clutch can be achieved easily but also the mounting state of the one-way clutch can be stabilized. Also, when the outer race of the one-way clutch is fitted into the fitting portion of the support portion of the reel main body, it is not necessary to fit the outer race with a strong force, which makes it possible to facilitate the assembling thereof and thus enhance the efficiency of the assembling operation. That is, since it is not so necessary to use a strong force in fitting the outer race of the one-way clutch into the support portion of the reel main body, it is possible to avoid as much as possible such an abnormal deformation phenomenon which can occur easily when the outer race of the one-way clutch is fitted into the support portion of the reel main body with a strong force, in particular, a phenomenon in which an error between the mutually fitting portions develops into an error between the axis of the mutually fitting members. Therefore, there can be obtained a reversal preventive function in which high-precision working is not required, the concentricity with respect to the rotation drive shaft is not impaired, but the degree of play for reversal is minimized due to the wedge action of the one-way clutch of a rolling type.

Also, since strong loads or shocks to be applied to the outer race of the one-way clutch in the reversal operation are dispersed through the rotation preventive member over to other portions of the structure than the outer race of the one-way clutch, direct loads or shocks to be applied to the mounting portion of the outer race of the one-way clutch can be relieved to thereby able to prevent the deformation and wear of the outer race mounting portion. Therefore, not only the switching operation of the one-way clutch of a rolling type through rotation of the retainer can be stabilized, but also a play-free and high-precision reversal preventive function can be always maintained for a long period of time.

Further, the support portion of the reel main body, the outer race of the one-way clutch, and the like can be formed of resin or the like which is relatively low-strength, so that the reel main body can reduce the manufacturing costs of the reel parts used as well as can reduce the weight of the whole reel.

What is claimed is:

1. A fishing reel comprising:

a reel main body;

a rotary drive shaft being rotatable in association with a handle;

a one-way clutch of a rolling type for allowing said rotary drive shaft to rotate in one direction and prohibiting the rotary drive shaft from rotating in a reverse direction to the one direction, said one-way clutch disposed between said rotary drive shaft and said reel main body, said one-way clutch including;

a rolling member; and an outer race disposed between said rolling member and said reel main body, said outer race having an engagement portion; and a rotation preventive member secured to both said engagement and said reel main body, to thereby prevent rotation of said outer race with respect to said reel main body in both said one and reverse directions.

2. A fishing reel according to claim 1, wherein said one-way clutch further includes:

a retainer holding said rolling member, said retainer rotatably supported with respect to said outer race; and a switching operation member provided in said reel main body and rotating said retainer so as to switch said one-way clutch between a one-way rotation state which allows said rotary drive shaft to rotate in the one direction but prohibits said rotary drive shaft from rotating in the reverse direction, and a two-way rotation state which allows the rotation of said rotary drive shaft in both directions.

3. A fishing reel comprising:

a reel main body;

a rotary drive shaft being rotatable in association with a handle;

a one-way clutch of a rolling type for allowing said rotary drive shaft to rotate in one direction and prohibiting the rotary drive shaft from rotating in a reverse direction to the one direction, said one-way clutch disposed between said rotary drive shaft and said reel main body, said one-way clutch including;

a rolling member; and an outer race disposed between said rolling member and said reel main body, said outer race having an engagement portion; and a rotation preventive member secured to both said engagement and said reel main body, to thereby prevent the rotation of said outer race with respect to said reel main body; wherein said rotating preventive member includes;

a ring portion penetrated by said rotary drive shaft; and a mounting piece projecting outwardly from said ring portion and engaging with said engagement portion of said outer race.

4. A fishing reel according to claim 3, wherein said engagement portion is a securing groove formed in an edge portion of said outer race and preventing the rotation of said rotation preventive member with respect to said outer race.

5. A fishing reel according to claim 3, wherein said reel main body includes a recess portion securing said mounting piece, so as to prevent the rotation of said rotation prevention member with respect to said reel main body.

* * * * *